(12) United States Patent
Yaacobi

(10) Patent No.: US 12,217,434 B2
(45) Date of Patent: *Feb. 4, 2025

(54) AUTOMATED RIGHT VENTRICLE MEDICAL IMAGING AND COMPUTATION OF CLINICAL PARAMETERS

(71) Applicant: KONINKLIJKE PHILIPS N.V., Eindhoven (NL)

(72) Inventor: Marina Yaacobi, Beer-Sheva (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,331

(22) Filed: Jun. 12, 2023

(65) Prior Publication Data

US 2023/0326034 A1  Oct. 12, 2023

Related U.S. Application Data

(63) Continuation of application No. 17/145,345, filed on Jan. 10, 2021, now Pat. No. 11,676,280.

(51) Int. Cl.
*G06T 7/11* (2017.01)
*G06T 3/4007* (2024.01)

(52) U.S. Cl.
CPC .............. *G06T 7/11* (2017.01); *G06T 3/4007* (2013.01); *G06T 2207/10132* (2013.01);
(Continued)

(58) Field of Classification Search
CPC ....... G06T 3/4007; G06T 7/0016; G06T 7/11; G06T 2208/10016; G06T 2208/10132;
(Continued)

(56) References Cited

U.S. PATENT DOCUMENTS

2011/0021915 A1  1/2011  Feng et al.
2011/0262018 A1  10/2011  Kumar et al.
(Continued)

OTHER PUBLICATIONS

Notice of Allowance Dated Mar. 22, 2023 from the US Patent and Trademark Office Re. U.S. Appl. No. 17/145,345. (7 pages).
(Continued)

*Primary Examiner* — Katrina R Fujita

(57) ABSTRACT

There is provided a method of processing 2D ultrasound images for computing clinical parameter(s) of a right ventricle (RV), comprising: selecting one 2D ultrasound image of 2D ultrasound images depicting the RV, interpolating an inner contour of an endocardial border of the RV for the selected 2D image, tracking the interpolated inner contour obtained for the one 2D ultrasound image over the 2D images over cardiac cycle(s), computing a RV area of the RV for each respective 2D image according to the tracked interpolated inner contour, identifying a first 2D image depicting an end-diastole (ED) state according to a maximal value of the RV area for the 2D images, and a second 2D US image depicting an end-systole (ES) state according to minimal value of the RV area for the 2D images, and computing clinical parameter(s) of the RV according to the identified first and second 2D images.

19 Claims, 8 Drawing Sheets

(52) U.S. Cl.
CPC ............... *G06T 2207/20081* (2013.01); *G06T 2207/20084* (2013.01); *G06T 2207/20104* (2013.01); *G06T 2207/20112* (2013.01); *G06T 2207/30048* (2013.01)

(58) Field of Classification Search
CPC . G06T 2208/20081; G06T 2208/20084; G06T 2208/20104; G06T 2208/20112; G06T 2208/30048
See application file for complete search history.

(56) References Cited

U.S. PATENT DOCUMENTS

| | | | |
|---|---|---|---|
| 2015/0038846 A1 | 2/2015 | Abe et al. | |
| 2015/0310612 A1* | 10/2015 | Beymer | G06T 7/0012 |
| | | | 382/128 |
| 2018/0279997 A1 | 10/2018 | Abe | |
| 2018/0357767 A1* | 12/2018 | Arakita | A61B 6/5217 |
| 2022/0012875 A1 | 1/2022 | Arnaout | |
| 2022/0222825 A1 | 7/2022 | Yaacobi | |

OTHER PUBLICATIONS

Office Action Dated Dec. 2, 2022 from the US Patent and Trademark Office Re. U.S. Appl. No. 17/145,345. (33 pages).

Addetia et al. "3-Dimensional Echocardiographic Analysis of the Tricuspid Annulus Provides New Insights Into Tricuspid Valve Geometry and Dynamics", JACC Journals, 12(3): 401-412, Mar. 2019.

Beecy et al. "Development of Novel Machine Learning Model for Right Ventricular Quantification on Echocardiography—A Multimodality Validation Study", Echocardiography, 37(5): 688-697, Published Online May 12, 2020.

Focardi et al. "Traditional and Innovative Echocardiographic Parameters for the Analysis of Right Ventricular Performance in Comparison With Cardiac Magnetic Resonance", European Heart Journal—Cardiovascular Imaging, 16(1): 47-52, Published Online Sep. 3, 2014.

Han "MR-Based Synthetic CT Generation Using A Deep Convolutional Neural Network Method", Medical Physics, 44(4): 1408-1419, Published Online Feb. 13, 2017.

Helbing et al. "On-Line Automated Border Detection for Echocardiographic Quantification of Right Ventricular Size and Function in Children", Pediatric Cardiology, 18(4): 261-269, 1997.

Horton et al. "Assessment of the Right Ventricle by Echocardiography: A Primer for Cardiac Sonographers", Journal of the American Society of Echocardiography, 22(7): 776-792, Jul. 2009.

Lang et al. "Recommendations for Cardiac Chahmber Quantification by Echocardiography in Adults: An Update From the American Society of Echocardiography and the European Association of Cardiovascular Imaging", Journal of the American Society of Echocardiography, 28(1): 1-39, Jan. 2015.

Li et al. "Prognostic Value of Right Ventricular Longitudinal Strain in Patients With COVID-19", Journal of the American College of Cardiology, JACC: Cardovascular Imaging, 13(11): 2287-2299, Published Online Apr. 28, 2020.

Motoji et al. "Efficacy of Right Ventricular Free-Wall Longitudinal Speckle-Tracking Strain for Predicting Long-Term Outcome in Patients With Pulmonary Hypertension", Circulation Journal, 7(3): 756-763, 2013.

Qin et al. "Automatic Segmentation of Right Ventricular Ultrasound Images Using Sparse Matrix Transform and A Level Set", Physics in Medicine and Biology, 58(21): 7609-7624, Published Online Oct. 10, 2013.

Quinones et al. "ACC/AHA Clinical Competence Statement on Echocardiography. A Report of the American College of Cardiology / American Heart Association / American College of Physicians—american Society of Internal Medicine Task Force on Clinical Competence", Journal of the American College of Cardiology, 41(4): 687-708, Feb. 19, 2003.

Ronneberger et al. "U-Net: Convolutional Networks for Biomedical Image Segmentation", International Conference on Medical Image Computing and Computer-Assisted Intervention, MICCAI 2015, Medical Image Computing and Computer-Assisted Intervention, p. 234-241, Nov. 18, 2015.

Vignon et al. "Quantitative Assessment of Regional Right Ventricular Function with Color Kinesis", American Journal of Respiratory and Critical Care Medicine, 159(6): 1949-1959, 1999.

Yaacobi et al. "Simultaneous Left Atrium Volume Tracking From Echocardiographic Movies", IEEE Convention of the Electrical and Electronic Engineers in Israel, 403-407, 2008.

\* cited by examiner

AUTOMATED RIGHT VENTRICLE MEDICAL IMAGING AND COMPUTATION OF CLINICAL PARAMETERS

RELATED APPLICATION

This application is a Continuation of U.S. patent application Ser. No. 17/145,345 filed on Jan. 10, 2021. The contents of the above application are all incorporated by reference as if fully set forth herein in their entirety.

FIELD AND BACKGROUND OF THE INVENTION

The present invention, in some embodiments thereof, relates to image processing and, more specifically, but not exclusively, to systems and methods for processing of ultrasound images of a heart.

Echocardiography is an important, widely-used imaging technique for clinical diagnosis of heart diseases. Due to its low cost and non-invasive nature, ultrasonic imaging became an integral diagnostic-imaging device, allowing qualitative and quantitative performance evaluation of the cardiovascular system, for example, as described with reference to Lang R M., Bierig M, Devereux R B. et al. *Recommendations for Cardiac Chamber Quantification by Echocardiography in Adults: An Update from the American Society of Echocardiography and the European Association of Cardiovascular Imaging JASE* 2015; DOI 10.1016/j.echo.2014.10.003.

SUMMARY OF THE INVENTION

According to a first aspect, a computer-implemented method of automatically processing two-dimensional (2D) ultrasound images for computing of at least one clinical parameter of a right ventricle (RV), comprises: selecting one 2D ultrasound image of a plurality of 2D ultrasound images depicting at least a RV of a subject, sequentially captured over at least one cardiac cycle of the subject, interpolating an inner contour of an endocardial border of the RV for the selected one 2D ultrasound image, tracking the interpolated inner contour obtained for the one 2D ultrasound image over the plurality of 2D images over the at least one cardiac cycle, computing a RV area of the RV for each respective 2D ultrasound image of the plurality of 2D ultrasound images, according to the tracked interpolated inner contour, identifying a first 2D ultrasound image depicting an end-diastole (ED) state according to a maximal value of the RV area for the plurality of 2D images, and a second 2D US image depicting an end-systole (ES) state according to minimal value of the RV area for the plurality of 2D images, and computing at least one clinical parameter of the RV according to the identified first 2D ultrasound image depicting the ED state and the second 2D US image depicting the ES state.

According to a second aspect, a system for automatically processing two dimensional (2D) ultrasound images for computing of at least one clinical parameter of a right ventricle (RV), comprises: at least one hardware processor executing a code for: selecting one 2D ultrasound image of a plurality of 2D ultrasound images depicting at least a RV of a subject, sequentially captured over at least one cardiac cycle of the subject, interpolating an inner contour of an endocardial border of the RV for the selected one 2D ultrasound image, tracking the interpolated inner contour obtained for the one 2D ultrasound image over the plurality of 2D images over the at least one cardiac cycle, computing, a RV area of the RV for each respective 2D ultrasound image of the plurality of 2D ultrasound images, according to the tracked interpolated inner contour, identifying a first 2D ultrasound image depicting an end-diastole (ED) state according to a maximal value of the RV area for the plurality of 2D images, and a second 2D US image depicting an end-systole (ES) state according to minimal value of the RV area for the plurality of 2D images, and computing at least one clinical parameter of the RV according to the identified first 2D ultrasound image depicting the ED state and the second 2D US image depicting the ES state.

According to a third aspect, a computer program product for automatically processing two dimensional (2D) ultrasound images for computing of at least one clinical parameter indicative of a right ventricle (RV) comprising program instructions which, when executed by a processor, cause the processor to perform: selecting one 2D ultrasound image of a plurality of 2D ultrasound images depicting at least a RV of a subject, sequentially captured over at least one cardiac cycle of the subject, interpolating an inner contour of an endocardial border of the RV for the selected one 2D ultrasound image, tracking the interpolated inner contour obtained for the one 2D ultrasound image over the plurality of 2D images over at least one cardiac cycle, computing, a RV area of the RV for each respective 2D ultrasound image of the plurality of 2D ultrasound images, according to the tracked interpolated inner contour, identifying a first 2D ultrasound image depicting an end-diastole (ED) state according to a maximal value of the RV area for the plurality of 2D images, and a second 2D US image depicting an end-systole (ES) state according to minimal value of the RV area for the plurality of 2D images, and computing at least one clinical parameter of the RV according to the identified first 2D ultrasound image depicting the ED state and the second 2D US image depicting the ES state.

In a further implementation form of the first, second, and third aspects, further comprising, after performing the identifying the first 2D ultrasound image depicting the ED state and the second 2D US image depicting the ES state, performing the interpolating for the first 2D ultrasound image depicting the ED state and the second 2D US image depicting the ES state, wherein the at least one clinical parameter is computed according to the first 2D ultrasound image depicting the ED state and the second 2D US image depicting the ES state with interpolated inner contour.

In a further implementation form of the first, second, and third aspects, further comprising: inputting the selected 2D image into a trained machine learning (ML) model trained on a training dataset including for each of a plurality of sample subjects, at least one 2D ultrasound image depicting a RV and a corresponding plurality of segmentation masks including: a RV cavity segmentation mask, a lateral tricuspid valve annulus segmentation mask, and a septal tricuspid valve annulus segmentation mask, and obtaining, for the selected 2D image, as an outcome of the ML model, a plurality of segmentation masks including: a RV cavity segmentation mask, a lateral tricuspid valve annulus segmentation mask, and a septal tricuspid valve annulus segmentation mask, extracting, an inner contour of an endocardial border of the RV for the selected one 2D ultrasound image based on the plurality of segmentation masks, extracting a plurality of valve indications for the selected one 2D ultrasound image, wherein the plurality of valve indications include a plurality of positions of a tricuspid valve extracted from a center region of the lateral tricuspid valve annulus segmentation mask, and extracted from a center region of the septal tricuspid valve annulus segmentation mask.

In a further implementation form of the first, second, and third aspects, further comprising automatically selecting a region of interest from the selected 2D image, the ROI including the RV cavity, the lateral tricuspid valve annulus, and the septal tricuspid valve annulus, wherein inputting the selected 2D image comprises inputting the ROI into the trained ML model, wherein the at least one 2D ultrasound image of the training dataset comprises the ROI image created from the at least one 2D ultrasound image of the training dataset.

In a further implementation form of the first, second, and third aspects, further comprising, for the selected 2D image of the plurality of 2D ultrasound images: extracting a respective border of the RV depicted in the selected 2D image using the respective cavity mask, and generating a binary image using the respective extracted RV border, wherein the extracting of the inner contour for the selected 2D image is based on the binary image.

In a further implementation form of the first, second, and third aspects, further comprising, for each 2D image of the plurality of 2D ultrasound images: segmenting around the respective extracted RV border on sampled points using local contrast enhancement, wherein the binary image is of the respective extracted RV border with segmentation.

In a further implementation form of the first, second, and third aspects, further comprising: classifying the RV into a predefined shape selected from a plurality of predefined shaped for the selected one 2D ultrasound image, wherein interpolating comprises interpolating the inner contour of the endocardial border of the RV according to the classified shape for the selected one 2D ultrasound image.

In a further implementation form of the first, second, and third aspects, further comprising: identifying a tricuspid valve of the inner contour, identifying an apex of the RV on the inner contour, dividing the inner contour into a lateral side and a septal side with respect to the apex and the tricuspid valve, wherein interpolating the inner contour is done each of the lateral side and the septal side according to the classified shape.

In a further implementation form of the first, second, and third aspects, the classified shape is selected from one of "triangle" and "square", and the lateral side is interpolated using a first interpolation method when the shape is triangle, and the lateral side is interpolated using a second interpolation method when the shape is square.

In a further implementation form of the first, second, and third aspects, the 2D ultrasound images exclude a correlation with electrocardiogram (ECG) data of the subject, and the ED state and the ES state are identified from the plurality of 2D ultrasound images without the correlation with ECG data.

In a further implementation form of the first, second, and third aspects, further comprising: creating a model of a trajectory of a tricuspid annulus location on a free wall between each pair of ED and ES denoting systole, and ES and next ED 2D images denoting diastole, comparing a predicted valve location to actual location from tracking and correct high deviation using the model and repeat interpolation to compute a deviation, when the deviation is above a threshold, the tracked valve location is corrected according to the model, and a border point interpolation process is repeated taking into account a corrected location of a left annulus point to obtain a corrected inner contour, calculate area of a chamber denoting the area enclosed in the tracked contours for each 2D ultrasound image based on the corrected inner contour, wherein the at least one clinical parameter comprises the calculated area.

In a further implementation form of the first, second, and third aspects, tracking further comprises tracking a plurality of locations of a tricuspid valve obtained for the one 2D ultrasound image, and computing the RV area further comprises computing the RV area according to the tracked plurality of locations of the tricuspid valve.

In a further implementation form of the first, second, and third aspects, wherein the at least one clinical parameter comprises at least one of: (i) a fractional area change (FAC) for the RV, (ii) a free wall strain (FWS) for the RV denoting the maximum strain of the free wall, wherein the FWS is computed for each respective cardiac cycle for the RV, RV basal diameter (RVD1), RV mid diameter(RVD2) and RV length (RVD3).

In a further implementation form of the first, second, and third aspects, wherein the at least one clinical parameter comprises at least one of: (i) a tricuspid annular plane systolic excursion (TAPSE), and further comprising computing the TAPSE by: computing the distance of lateral free wall tricuspid valve annulus from an apex in ED to obtain a first value, computing the distance of lateral free wall tricuspid valve annulus from the apex in ES to obtain a second value, and computing a difference between the first value and the second value, and (ii) a peak systolic velocity of a tricuspid annulus (S'), and further comprising computing the S' by: computing a displacement curve by computing a respective distance of lateral free wall tricuspid valve annulus from an apex each of the plurality of 2D US images of a respective cardiac cycle and subtracting from each respective distance the relative displacement denoting a change in distance, wherein the change in distance is computed by deriving a distance curve of the respective 2D image with respect to frame time to obtain the velocity of movement in a corresponding location, wherein S' denotes the maximum of the velocity value per respective cardiac cycle.

In a further implementation form of the first, second, and third aspects, each of the at least one clinical parameters is computed for each cardiac cycle depicted in the plurality of 2D ultrasound images.

In a further implementation form of the first, second, and third aspects, further comprising treating the subject for a medical condition selected from the group consisting of: impaired heart function, cardiac injury due to COVID-19, pulmonary embolism, pulmonary hypertension (PH), congenital heart disease (CHD), coronary artery disease, left-sided heart failure (HF), right-sided heart failure, and valvular heart disease, using a treatment effective for the medical condition, selected from the group consisting of: fibrinolysis, thrombolytic, anticoagulant, pacemaker, beta blockers, nitrates, oxygen, morphine, ACE inhibitors, insulin, ATII receptor blockers (ARBs), diuretics, cardiac defibrillation, cardiac surgery, trans catheterization, stent placement, valve replacement.

In a further implementation form of the first, second, and third aspects, further comprising iteratively computing the at least one clinical parameter over a plurality of time intervals, and plotting, on a display, a trend line of the at least one clinical parameters for the plurality of time intervals.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
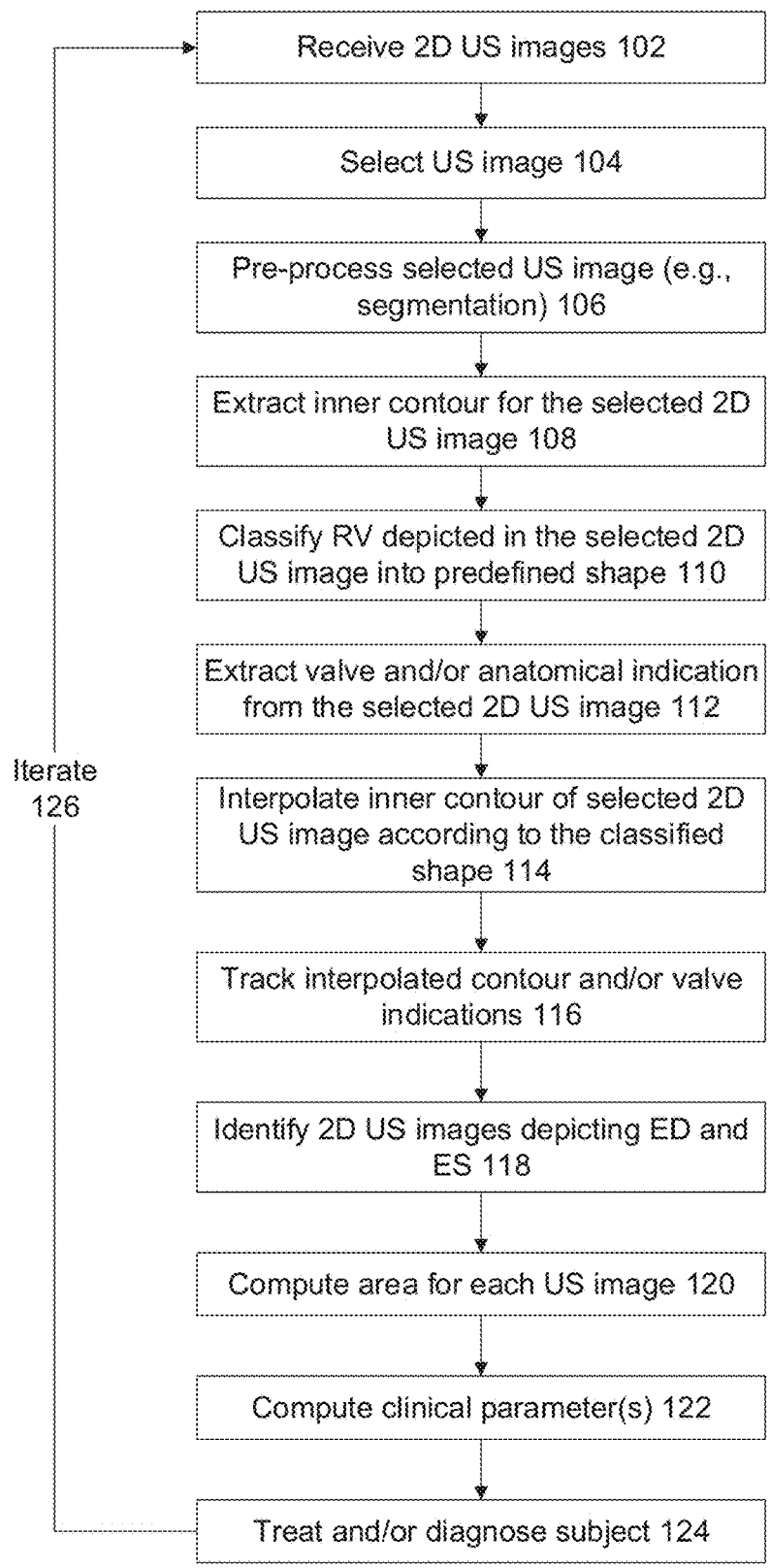
FIG. 1 is a flowchart depicting of a method of automatically processing 2D US images for computing one or more clinical parameters of the RV, in accordance with some embodiments of the present invention.

The present invention, in some embodiments thereof, relates to image processing and, more specifically, but not exclusively, to systems and methods for processing of ultrasound images of a heart.

An aspect of some embodiments of the present invention relates to systems, methods, an apparatus, and/or code instructions (stored on a memory and executable by one or more hardware processors) for automatically processing two dimensional (2D) ultrasound (US) images depicting a right ventricle (RV) of a heart, and computing one or more clinical parameters according the processed images. The clinical parameters are automatically computed from the 2D images, and not from 3D US images. The 2D images may be directly acquired by the US transducer, and not extracted from 3D US images. The clinical parameters are computed without using ECG data correlated with the 2D US images. The clinical parameter(s) may be computed based on end-diastolic (ED) and end-systolic (ES) 2D US images that are automatically identified within the sequence of 2D images, without corresponding ECG data.

The US images are obtained as a sequence, optionally frames of a video, over one or more cardiac cycles. One (or more) 2D ultrasound image may be selected. The inner contour of an endocardial border of the RV may extracted for the selected 2D US image. The inner contour is interpolated, optionally according to a classification of the shape of the RV, for example, "triangle" shape or "square" shape. Indications of the tricuspid valve (e.g., indication of location of the tricuspid valve or portions thereof in the respective image) may be extracted for the 2D US image. The interpolated inner contour and the indications of the location tricuspid valve may be tracked over the sequence of images over one or more cardiac cycles. An area of the RV is computed for each 2D US image according to the tracked inner contour and/or the indication of the location of the tricuspid valve. 2D US images denoting the ED and ES state are identified for each cardiac cycle. The 2D US image denoting the ED state is identified as the US image with maximal value of the area of the RV over the respective cardiac cycle. The 2D US image denoting the ED state is identified as the US image with maximal value of the area of the RV over the respective cardiac cycle. The 2D US image denoting the ES state is identified as the US image with minimal value of the area of the RV over the respective cardiac cycle. One or more clinical parameters of the RV are computed according to the identified ES and/or ED images, and/or according to the tracked valve locations. The clinical parameters may denote the area of the RV and/or indicative of function of the RV. A diagnosis of a medical condition may be made based on the clinical parameters, for example, pulmonary embolism. The subject may be treated for the medical condition using a suitable treatment that is effective for the medical condition.

At least some implementations of the systems, methods, apparatus, and/or code instructions (e.g., stored in a memory and executable by one or more hardware processors) described herein address the technical problem of automated approaches for computation of clinical parameters indicative of function and/or area of the right ventricle. At least some implementations of the systems, methods, apparatus, and/or code instructions described herein improve the technical field and/or the medical field of automated approaches for computation of clinical parameters indicative of function of the right ventricle.

In at least some implementations, the technical problem and/or technical improvement is for a fully automated processing approach of 2D US images (which may be manually captured by an operator) that does not use ECG data correlated with the 2D US images.

In adults, Right Ventricular (RV) function may be impaired, for example, in pulmonary hypertension (PH), congenital heart disease (CHD), and coronary artery disease, and/or in patients with left-sided heart failure (HF) or valvular heart disease. For example, pulmonary hypertension affects RV size and/or shape. Inventors realized that as the RV increases in size, the shape of the RV that at first correlates with a triangle-like shape changes to be correlated with a square like shape. Therefore, Inventors realized the surprising result that abnormal RV size and/or change in RV size may be an indication of pulmonary embolism and/or other cardiac problems. Studies have demonstrated the prognostic value of RV function in management of cardiovascular disease, for example, as described with reference to 0 Horton et. al. *Assessment of the Right Ventricle by Echocardiography: A Primer for Cardiac Sonographers* 10.1016/j.echo.2009.04.02, as well as the importance of RV function evaluation in point of care (POC) environment for fast screening.

RV function and/or RV size monitoring may be important for hospitalized patients. For example, in the ICU after surgery, blood clots that may develop into pulmonary embolism may be life threatening. By monitoring the RV, pulmonary embolism condition may be discovered and treated early. RV function evaluation may be significant for follow up of Covid-19 patients. In Covid-19, in addition to the impact on the lungs, there may be complications related to the heart, for example, myocardial damage and heart failure which may be the cause of death rather than from effects of Covid-19 on the lungs. For example, Yuman Li et al.

*Prognostic Value of Right Ventricular Longitudinal Strain in Patients with COVID*-19. JACC. 2020, describes the importance of RV evaluation in Covid-19 patients and specifically the prognostic value of RV strain. The study has showed that in the group of patients with lowest RV strain, there was higher likelihood to have complications and higher mortality rate. In addition, compared with survivors, non-survivors have displayed an enlarged right-heart chamber, and diminished RV function.

The technical challenge addressed by at least some implementations of the systems, methods, apparatus, and/or code instructions described herein address, is that despite the need for accurate evaluation of the RV, correct RV function evaluation remains challenging in clinical practice, for example, due to its complex shape (e.g., as described with reference to Armstrong W F, Ryan T. *Feigenbaum's Echocardiography.* 6th edition] and/or the absence of a single accepted measurement that represents the RV systolic function [e.g., as described with reference to Horton et. al. *Assessment of the Right Ventricle by Echocardiography: A Primer for Cardiac Sonographers* 10.1016/j.echo.2009.04.02].

Existing quantitative approaches for RV evaluation rely on manual measurements and are thus subjective and/or time-consuming. Consequently, in clinical practice, qualitative assessment is usually used instead, mainly by visual estimation which requires an experienced interpreter with a high level of training, for example, as described with reference to Quin A M et al. *ACC/AHA Clinical Competence Statement on Echocardiography. J. Am. Coll. Cardiol.* 2003; 41(4): 687:708.

In particular, RV evaluation is technically challenging, since the American Society of Echocardiography (e.g., as described with reference to Focardi et. al. *Traditional and innovative echocardiographic parameters for the analysis of right ventricular performance in comparison with cardiac magnetic resonance* 2015 January; 16(1):47-52. doi: 10.1093/ehjci/jeu156) recommends examining the right heart as part of all echo studies, and to report qualitative and quantitative parameters for RV size and RV systolic function measured from the 4CH apical view. While the guidelines specify using modified or focused 4CH view for evaluation, in practice all apical 4CH view variation may be used according to specific approach in the echo labs and in point of care (POC) environment because of imaging difficulties the standard apical 4CH view is mostly used.

Since no single measurement describes accurately the RV function, one or more clinical parameters indicative of RV function may be determined. Using multiple quantitative measurements required for quantitative evaluation is time consuming and not practical for POC environment. Clinical parameters indicative of RV function may be difficult, subjective (i.e., operator dependent), time consuming to manually determine, and/or may be prone to error, resulting in that such clinical parameters are rarely computed in clinical practice. For example, manually determining end diastolic images and/or end systolic images used to determine the clinical parameter(s), and then performing calculations using measurements of the end diastolic and end systolic frames may be difficult, time consuming, subjective, and/or error prone.

At least some implementations provide a technical solution to the technical problem and/or technical improve the field, by providing an automated approach for computation of clinical parameters for evaluation of RV function based on 2D ultrasound images and without necessarily using correlated ECG signals, which is objective and/or repeatable, and/or may be applied by an ultrasound technical without necessarily requiring high level of training. At least one clinical parameter is computed using ED and ES US images identified from the sequence of US images without using corresponding ECG data. The ED and ES images are identified according to the minimal and maximal size of the RV computed for each US image based on the tracked interpolated inner contour.

At least some implementations of the systems, methods, apparatus, and/or code instructions described herein address the technical problem of an automated approach for automatic detection of a contour of an endocardial border of a RV from 2D ultrasound images. At least some implementations of the systems, methods, apparatus, and/or code instructions described herein improve the technical field of imaging process, by providing an automated approach for automatic detection of RV borders (e.g., a contour of an endocardial border of the RV) from 2D ultrasound images.

At least some implementations provide a technical solution to the technical problem and/or technical improve the field, by detecting the contour (which may be discontinuous) in a selected 2D US image, and interpolating the contour according to a classified shape of the RV depicted in the image, for example, "triangle" or "square". The interpolated contour identified for the selected US image is tracked in the other US images over one or more cardiac cycles. Clinical parameters indicative of the function of the RV may be computing based on the detected and/or tracked RV endocardial borders (i.e., contour) from 2D ultrasound images.

Automatic contour detection in ultrasound images is often considered to be a difficult image processing task. The true contours might be confused with local false edges caused by speckle noise which is superimposed on the image and hides the target tissue, and/or the true contours may be vague and/or partially missing. Contour detection is particularly technically challenging for the RV, because variation in imaging techniques dropouts of the walls are not rare especially in the apical region of the free wall, furthermore, the edges of the moderator band typically visible in the RV cavity and/or a pacemaker (if exist), might be confused with the actual border of the RV walls, especially in combination with walls dropout.

Some existing approaches are semi-automated, requiring a user to provide input for the initialization of the RV endocardial border detection and/or adjust the initial borders based on predefined shape and/or an initial guess of the contours. In contrast, at least some implementations of the systems, methods, apparatus, and/or code instructions described herein provide a fully automated approach that does not require user input.

Due to the complex shape of the right ventricle, existing approaches based 3D technologies have been developed to evaluate the RV function quantitatively using 3D US probe. In contrast, at least some implementations of the systems, methods, apparatus, and/or code instructions described herein operate on 2D ultrasound images.

Other existing approaches support analysis from multiple 2D views derived from 3D imaging data from the same heartbeat, by obtaining initial borders for all views and adjusting them before tracking. Such procedure is time consuming and very subjective, therefore not used currently in everyday practice as part of the routine US evaluation in the echo units and is too complicated to be used in POC environment by non-experts. In contrast, at least some implementations of the systems, methods, apparatus, and/or code instructions described herein operate based on a single 2D view for the same heartbeat, obtained by standard imaging approaches using standard 2D ultrasound probes.

It is noted that as described herein, the term heartbeat and cardiac cycle may be interchanged, both including one diastolic portion and one systolic portion, from which a ED US image and a ES US image may be extracted, as described herein.

Exiting 3D based approaches are mostly used by expert Echocardiologists and are mostly utilized for research purposes, making them impractical for standard clinical practice. Existing approaches based on 2D semi-automated RV evaluation methods require the user to provide input for the initialization of the RV endocardial border in a single frame and adjust the borders. Some approaches are based on nonspecialized semi-automated tools that were developed for the analysis of the left ventricle for the purpose of strain analysis to be applied for RV strain evaluation as well. Other approaches use semi-automated methods to calculate the recommended RV function measurements. Regardless of the implementation all prior approaches are subjective, time consuming, depend on initial input which requires experienced user, and therefore cannot be used in the POC environment. In contrast, at least some implementations of the systems, methods, apparatus, and/or code instructions described herein are designed for the RV, are fully automated, and/or fast, making them objective, real time, not dependent on initial input which enables use by less experienced uses, and therefore are practical for use in the POC environment.

At least some implementations of the systems, methods, apparatus, and/or code instructions described herein provide automatic RV border detection based on 2D ultrasound image data, which is fast, accurate, and/or robust echocardiographic evaluation of the RV systolic function. Moreover, implementations described herein provide automatic, quantitative information that is currently otherwise available using standard approaches by switching between different scanning modes including B-mode, M-mode and Doppler, which is cumbersome, time consuming, error prone, and difficult for non-expert users to perform.

Automatic RV contour detection may be described as a segmentation problem. An existing approach to RV border detection is based on a simple assumption that different parts composing the image are delimited by borders. Hence, border pixels (edges) may be obtained by extraction and grouping of points at the transition between different parts in the image, to form closed boundaries. Such simple approaches cannot be used in fully automated detection approaches, for example, since the RV border is not continuous (e.g., due to imaging artifacts and/or properties of the ultrasound images, as described herein), posing a technical challenge to imaging of the RV border.

Existing approaches for automated border detection of the left ventricle (LV) of the heart cannot be applied to RV border detection, for example, due to the unique shape of the RV which changes as a function of the pulmonary pressure and/or due the high variability in the image acquisition (e.g., which creates artifacts that make is difficult to detect the border, as described herein). At least some implementations of the systems, methods, apparatus, and/or code instructions described herein detect automatically detect the RV border.

Some existing approaches for RV analysis are designed for three-dimensional echocardiography (3DE) assessment of RV, making such approaches irrelevant for 2D RV assessment.

At least some implementations of the systems, methods, apparatus, and/or code instructions described herein detect automatically detect and/or track the RV border using 2D ultrasound images, and/or provide improvements over other existing approaches. For example:

An approach based on automatic segmentation of right ventricular ultrasound images using sparse matrix transform and a level set is described with reference to Qin X, Cong Z, Fei B. *Automatic segmentation of right ventricular ultrasound images using sparse matrix transform and a level set. Phys Med Biol.* 2013; 58(21): 7609-7624. doi: 10.1088/0031-9155/58/21/7609. The approach does not describe how clinical parameters indicative of RV function are computed, making it unclear whether clinical parameter indicative of RV function may be computed based on this approach at all. Moreover, using the level set method in this approach, the detected border may consist of multiple disconnected surfaces, making this approach sensitive to dropouts, which are the main issue analyzing ultrasound data and RV specifically. As such, this approach cannot be used to compute clinical parameters indicative of RV function, as described herein.

Another approach is based on a machine learning model for RV quantification from 2D echo, or example as described with reference to Ashley N. Beecy. Et al. *Development of novel machine learning model for right ventricular quantification on echocardiography—A multimodality validation study. Echocardiography.* 2020 May; 37(5): 688-697. An automated ML model was developed to track the tricuspid annulus on echo using a convolutional neural network approach. The described ML model is a modified U-net, described with reference to Ronneberger O, Fischer P, Brox T. *U-Net: convolutional networks for biomedical image. Segmentation.* 2015; 234-241 Ashley et al. investigates the use of two new parameters for RV function evaluation by finding a location of the mitral annulus using the neural network. The described approach has several limitations The first limitation is clinical, The approach uses the two new parameters that are calculated from the annulus shortening as a clinical indication of the RV function. Since the RV function is determined by several parameters, looking at only shortening of the annulus does not provide sufficient information. Furthermore, the two new parameters are not indicated by the guidelines for RV function evaluation and therefore are not clinically acceptable. The limitation using these parameters as indication of RV function is supported by the results that showed high sensitivity and very low specificity. Specificity and sensitivity of longitudinal and circumferential displacements calculated by the neural network as well of TAPSE were calculated vs RVEF by CMR. The neural network showed good sensitivity (80-86%) but low specificity (39-43%) compared to RVEF by CMR implying under estimation of the RV function by the neural network while sensitivity and specificity of TAPSE compared to RVEF by CMR were 74% and 83% respectively. The second limitation is related to implementation. Since the neural network was utilized to detect the annulus of the tricuspid valve on every frame of the ultrasound clip, the neural network is irrelevant for practical clinical use, where high performance and/or dedicated processors (e.g., GPUs, parallel processing architectures) are unavailable. In the study, the neural network was tested on a workstation with four CPU cores, 64 GB of system memory, and a graphics-processing unit (GPU) with 11 GB of video memory (NVIDIA [Santa Clara] GTX 1080 Ti), reporting high speed results. Such computational setups are not standard, and not commonly found. For example, point of care (POC) ultrasound systems and mobile phones have limited processing power and the processing is usually done on the CPU. Feeding each ultrasound image into the neural network is computationally intensive, taking significantly long amounts of time when performed by standard processors (e.g., CPUs) that are commonly found (e.g., in a laptop, desktop, smartphone) in standard clinical environments. Activating the neural network for each frame is very slow on POC devices such as mobile devices and therefore not feasible as a usable solution.

At least some implementations of the systems, methods, apparatus, and/or code instructions described herein compute clinical parameters indicative of RV function based on 2D ultrasound images that is computationally efficient and/or that improves computational performance of a computer that computes the clinical parameters, for example, providing real time or near real time performance using standard CPUs that may exclude GPUs, for example, inference by a ML model (e.g., neural network) is not performed on every frame (and/or every frame of a selected sequence) of the received US images.

At least some implementations of the systems, methods, apparatus, and/or code instructions (e.g., stored in a memory and executable by one or more hardware processors) described herein address the technical problem of automated approaches for computation of clinical parameters indicative of function of the right ventricle based on 2D ultrasound images. At least some implementations of the systems, methods, apparatus, and/or code instructions described herein improve the technical field and/or the medical field of automated approaches for computation of clinical parameters indicative of function of the right ventricle based on 2D ultrasound images. In contrast, other approaches are based on manual interpretation, manual calculation of clinical parameters, and/or 3D ultrasound images.

At least some implementations of the systems, methods, apparatus, and/or code instructions described herein address the technical problem of automated approaches for computation of clinical parameters indicative of function of the right ventricle that are executable by relatively few computational resources, for example, standard CPUs located in a smartphone and/or laptop. At least some implementations of the systems, methods, apparatus, and/or code instructions described herein improve computational efficiency of a processor, by reducing the computational resources for computing of clinical parameters based on ultrasound images. In contrast, other approaches require significant computational resources to evaluate ultrasound images, for example, require using dedicated and/or specially designed processors such as GPUs. Significant computational resources are required, for example, to process a large number of ultrasound images by neural networks, which are computationally intensive processes. Significant computational resources are required, for example, to process 3D ultrasound images.

At least some implementations of the systems, methods, apparatus, and/or code instructions described herein address the technical problem of automated approaches for computation of clinical parameters indicative of function of the right ventricle that are performed without ECG data. At least some implementations of the systems, methods, apparatus, and/or code instructions described herein improve the technical field of automated approaches for computation of clinical parameters indicative of function of the right ventricle, by performing the computation without ECG data. Using standard approaches, ECG data synchronized with ultrasound images is analyzed to determine different states of the heart during the cardiac cycle, for example, end diastolic and/or end systolic. Once the target stats of the heart are determined from the ECG, corresponding ultrasound images synchronized with the ECG data may be identified. Using ECG data adds increased complexity, requiring placement of ECG electrodes, and synchronizing the ECG data with the ultrasound images. Accurate synchronization between EEG signals and captured ultrasound images, which may be difficult to obtain, is required in some prior approaches in order to correctly select the desired ultrasound images from corresponding selected parts of the ECG signal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
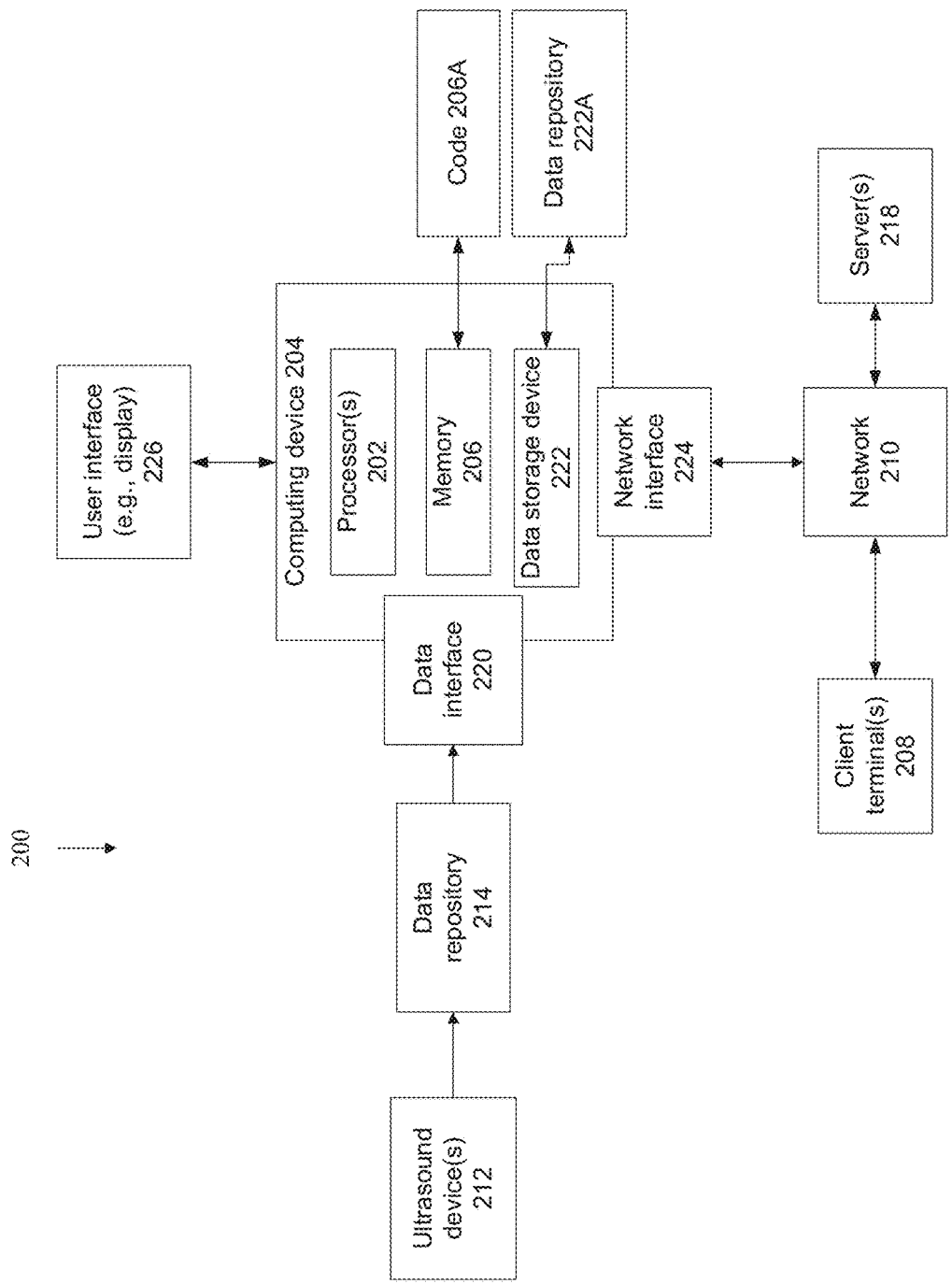
FIG. 2 is a block diagram of components of a system for automatically processing 2D US images for computing one or more clinical parameters of the RV, in accordance with some embodiments of the present invention.

Reference is now made to FIG. 1, which is a flowchart depicting of a method of automatically processing 2D US images for computing one or more clinical parameters of the RV, in accordance with some embodiments of the present invention. Reference is also made to FIG. 2, which is a block diagram of components of a system 200 for automatically processing 2D US images for computing one or more clinical parameters of the RV, in accordance with some embodiments of the present invention in accordance with some embodiments of the present invention. System 200 may implement the acts of the method described with reference to FIG. 1, optionally by a hardware processor(s) 202 of a computing device 204 executing code instructions 206A stored in a memory 206.

Computing device 204 may be implemented as, for example, a client terminal, a server, a virtual server, a radiology workstation, a virtual machine, a computing cloud, a mobile device, a desktop computer, a thin client, a Smartphone, a Tablet computer, a laptop computer, a wearable computer, glasses computer, and a watch computer. Computing 204 may include an advanced visualization workstation that sometimes is provided as an add-on to an ultrasound workstation and/or other devices for presenting indications of clinical parameters, such as of the right ventricle and/or other computer added features to the user.

Computing device 204 may include locally stored software that performs one or more of the acts described with reference to FIG. 1 and/or may act as one or more servers (e.g., network server, web server, a computing cloud, virtual server) that provides services (e.g., one or more of the acts described with reference to FIG. 1) to one or more client terminals 208 (e.g., ultrasound devices, remotely located ultrasound workstations, remote picture archiving and communication system (PACS) server, remote electronic medical record (EMR) server, computing device that receives ultrasound images captured by the ultrasound device) over a network 210, for example, providing software as a service (SaaS) to the client terminal(s) 208, providing an application for local download to the client terminal(s) 208, as an add-on to a web browser and/or a medical imaging viewer application, and/or providing functions using a remote access session to the client terminals 208, such as through a web browser.

Different architectures based on system 200 may be implemented. In one example, computing device 204 provides centralized services to each one of multiple ultrasound devices 212. Ultrasound images captured by respective ultrasound device(s) 212 are provided to computing device 204, for example, over a network 210, via an API, a local application, and/or transmitted using a suitable transmission protocol, via a data repository 214 (e.g., PACS, EMR) and/or via client terminal 208. Computing device 204 analyzes the ultrasound images, and computes an outcome, for example, one or more clinical parameters indicative of function of the right ventricle, as described herein. The clinical parameters may be provided to the respective ultrasound device 212 and/or to another device such as client terminal(s) 208 and/or server(s) 218 for presentation on a display, storage, and/or further processing. In another example, computing device 204 provides dedicated services to one ultrasound device 212. For example, computing device 204 is integrated with ultrasound device 212 (e.g., code 206A is installed on an ultrasound workstation that displays ultrasound images captured by an ultrasound transducer), and/or computing device 204 is connected to ultrasound device 212 (e.g., smartphone connected to ultrasound device 212, for example, via a short range wireless connection, USB cable, and/or other implementations). Ultrasound images captured by ultrasound device 212 are processed by locally installed code 206A and the outcome (e.g., clinical parameters indicative of right ventricle function) is provided for presentation on a display of ultrasound device 212 and/or of the locally connected computing device 204. Code 206A may provide an additional set of features to ultrasound device 212, by dynamically computing the outcome (e.g., clinical parameters indicative of right ventricle function) in real time, or near real time, as the ultrasound images are captured, or shortly after the ultrasound images are captured.

Ultrasound device 212 may be a standard 2D ultrasound imaging device that captures standard 2D ultrasound images, for example, a 2D cardiac echo machine. 2D ultrasound image may be captured as individual still images, and/or as frames of a video. Optionally, ultrasound device 212 excludes a 3D ultrasound imaging device that captures 3D ultrasound images.

2D ultrasound images captured by ultrasound device 212 may be stored in a data repository 214, for example, a memory and/or storage device of ultrasound device 212, an external hard drive connected to ultrasound device 212, a PACS device, an EMR, and a cloud storage device.

Computing device 204 may receive the 2D ultrasound images from imaging device 212 and/or data repository 214 using one or more data interfaces 220, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)).

Hardware processor(s) 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include one or more processors (homogenous or heterogeneous), which may be arranged for parallel processing, as clusters and/or as one or more multi core processing units.

It is noted that at least some implementations of the systems, apparatus, methods, and/or code instructions described herein are designed to process the 2D ultrasound images on processors with relatively few computational resources, for example, a CPU of a smartphone, in comparison to processing the 2D ultrasound images on high performance processors such as GPUs. This allows the images to be processed on readily available computational devices, such as a laptop and/or smartphone, rather than requiring installation of a high performance processor.

Memory 206 (also referred to herein as a program store, and/or data storage device) stores code instruction for execution by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). For example, memory 206 may store code 206A that implement one or more acts and/or features of the method described with reference to FIG. 1.

Computing device 204 may include a data storage device 222 for storing data, for example, data repository 222A that stores computed clinical parameters (e.g., for computing trends thereof). Data storage device 222 may be implemented as, for example, a memory, a local hard-drive, a removable storage device, an optical disk, a storage device, and/or as a remote server and/or computing cloud (e.g., accessed over network 210).

Computing device 204 may include a network interface 224 for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations.

It is noted that data interface 220 and network interface 224 may exist as two independent interfaces (e.g., two network ports), as two virtual interfaces on a common physical interface (e.g., virtual networks on a common network port), and/or integrated into a single interface (e.g., network interface). Computing device 204 may communicate using network 210 (or another communication channel, such as through a direct link (e.g., cable, wireless) and/or indirect link (e.g., via an intermediary computing device such as a server, and/or via a storage device) with one or more of:

Client terminal(s) 208, for example, when computing device 204 acts as a central server providing centralized image analysis services (e.g., SaaS) to remote ultrasound machines 212, for analyzing remotely obtained 2D ultrasound images to generate respective outcomes, for example, clinical parameters indicative of RV function.

Server 218, for example, implemented in association with a PACS, which may store ultrasound images acquired by ultrasound machine 212, store updated versions of code 206A for upgrade thereof.

Imaging device 212 and/or data repository 214 that may store 2D images acquired by imaging device 212.

Computing device 204 and/or ultrasound device 212 and/or client terminal(s) 208 and/or server(s) 218 include and/or are in communication with a user interface(s) 226 that includes a mechanism designed for a user to enter data (e.g., patient data) and/or view data (e.g. the outcome, such as clinical parameters indicative of RV function). Exemplary user interfaces 226 include, for example, one or more of, a touchscreen, a display, a keyboard, a mouse, and voice activated software using speakers and microphone.

Referring now back to FIG. 1, at 102, 2D US images depicting at least the RV of the subject are received. The 2D US images are captured over at least one cardiac cycle, optionally multiple cardiac cycles. Multiple 2D images are captured over each cardiac cycle. The elapsed time between each sequential pair of 2D images may be short enough so that one or more images are captured at the systolic portion of the cardiac cycle, and one or more images are captured at the diastolic portion of the cardiac cycle. The 2D US images may be received as frames of a video clip.

Optionally, multiple video clips are obtained. Each video clip may depict about 1-3 cardiac cycles (i.e., containing systole and diastole), or other higher number of cardiac cycles therein.

Optionally, the 2D US images are captured at a 4 chamber (4CH) apical view of the heart. The standard 4CH view may be imaged or a dedicated 4CH view according to published clinical guidelines, recommended for the RV analysis. Other views for imaging and assessment of the RV by 2D US include: parasternal long-axis view (PLAX), and Subcostal views. It is noted that in practice, the captured 2D US images obtained in an echo examination (e.g., routine examination) may be from different angles defined by clinical guidelines, and other angles not defined by clinical guidelines (e.g., which may be incorrectly captured). Embodiments described herein may processes any of the different possible views of the RV depicted in the 2D US images, even when the 2D US images are captured at views that in best practice/clinical guidelines are defined for visual estimation of the RV and are not recommended in best practice/clinical guidelines for quantitative measurements of RV size or function, for example, PSAX, PLAX and subcostal views.

The acquisition of the 2D US images may be done from a single position (i.e., no sweeping) of the probe per single clip of multiple sequential 2D US images, where the contraction and relaxation of the RV are captured (e.g., at least one beat). Several clips may be acquired in the same examination, where the different clips may appear very different even if acquired from the 4CH view.

Optionally, the 2D US images exclude a correlation with electrocardiogram (ECG) data of the subject, i.e., the 2D US images are not connected to ECG data collected at the time of imaging. The processing described herein is performed without correlation to ECG data. For example, 2D ultrasound images depicting the end diastolic (ED) and/or end systolic (ES) stage are identified from the multiple 2D US images without relying on the correlation with ECG data, based on the largest and smallest areas computed for the respective 2D images, as described herein. This is in contrast to other standard approaches where the ED and ES US images are identified by the correlation with ECG data by analyzing the ECG data. For example, such standard approach use the correlation between the time of the QRS of the ECG signal and the US images to identify the beginning of systole (i.e., ED US frame) and the end of the T way of the ECG signal to identify the end of system (i.e., ES US frame). Avoiding the reliance on ECG as described herein provides several potential advantages over existing approaches that use ECG. For example, the synchronization between ECG and US may not be accurate, ECG signals may be noisy, ECG may not be available, and ECG signals may vary, for example, when an arrhythmia is present, and/or when medical heart conditions such as a myocardial infarction is present.

At 104, a US image (e.g., single US image) is selected from the multiple US image. Optionally, the single US image is selected per set of multiple US images, optionally per video clip. Alternatively or additionally, a respective single US image may be selected per cardiac cycle. The single US frame may be selected, for example, at approximately ⅓ along the length of the video clip of US images, optionally when each video clip is about 2-3 heart beats long. The frame ⅓ along the length of the video clip may depict the first heartbeat. Selecting the frame ⅓ along the length is rather that the first frame(s) has been found by inventors to provide higher statistical significance when used.

At 106, the single US image may be pre-processed. The pre-processing may include segmentation(s).

The pre-processing may be performed to generate a binary image used for extraction of the inner contour of the RV. The inner contour may be difficult to extract without the generated binary image, since the US images may include non-connected portions, may include artifacts that disrupt the clarity of the inner contour, and/or otherwise incomplete. The lack of completion of the inner contour depicted in the 2D image may arise due to multiple factors related to US image acquisition, including, improper selection of US parameters, lack of operator skill, artifacts in the US image, and the nature of capture of 2D US slices of a moving object.

The pre-processing may include the following features:

A region of interest (ROI) may be defined (e.g., extracted, mask applied to non-ROI portion) for the single US frame, for example, by segmentation code, image processing code, a trained machine learning model (e.g., neural network), and a user manually selecting the ROI (e.g., using a GUI to mark the ROI on at least one image and/or select the ROI from a predefined list) and/or other approaches. The ROI separates the left and right sides of the heart with respect to the septum, where the ROI includes the RV and optionally the right atrium (RA). The ROI may include the RV cavity, the lateral tricuspid valve annulus, and/or the septal tricuspid valve annulus. Identifying the ROI may enable retaining higher resolution of the RV during an inference process by a trained ML model which requires reduced image size. The ROI may minimize errors during the inference process, for example, to avoid the ML model performing the inference process incorrectly selecting the left ventricle over the right ventricle, especially when both are visible. The ROI may be rotated, for example, to a target orientation which may be defined according to an expected input of another process, such as a trained neural network The selected 2D image, optionally the ROI of the selected 2D image depicting the RV, may be inputted into a trained machine learning (ML) model, for example, a neural network, such as UNET. The ML model is trained on a training dataset including for each of a plurality of sample subjects, at least one 2D ultrasound image (and/or the ROI image created from the 2D US image(s)) depicting a RV (or depicting the ROI which includes the RV) and corresponding segmentation mask(s) including one or more of: a RV cavity segmentation mask, a lateral tricuspid valve annulus segmentation mask, and a septal tricuspid valve annulus segmentation mask.

Segmentation mask(s) are obtained as an outcome of the ML model fed the selected 2D image. The segmentation mask(s) may include on or more of: a RV cavity segmentation mask, a lateral tricuspid valve annulus segmentation mask, and a septal tricuspid valve annulus segmentation mask. The extracting of the inner contour as described herein may be based on the segmentation masks.

It is noted that it is difficult to detect the leaflets of the valve or the ROI of the annulus because they are not always visible well and change between frames. Since in practice there is no 100% overlap between the segmentation mask of the chamber and valve locations, multiple segmentation masks are used to improve detection over a single mask.

The identified valve indication(s) may denote one or more locations of the tricuspid valve. The valve indications may be extracted from a center region of the lateral tricuspid valve annulus segmentation mask, and/or extracted from a center region of the septal tricuspid valve annulus segmentation mask.

A respective border of the RV depicted in the selected 2D image may be extracted from the segmentation mask (e.g., the cavity mask, the binary image of the RV) by taking the contour. The extracted border of the RV may include multiple contour points. The contour points may be interpolated to a lower number of points. The number of points may be determined by the shape of the borders. Segmentation around the extracted RV borders may be performed on the sampled points, optionally the interpolated points. The segmentation may be a local segmentation, for example, using local contract enhancement processes such as local histogram equalization, for example, into 3 levels (e.g., white, gray, black) followed by grouping the gray and black levels. A binary ROI image of the extracted segmented RV border may be generated from the segmentation process.

At 108, for the selected 2D US image, optionally the pre-processed 2D US image, an inner contour of an endocardial border of the RV depicted in the respective 2D image is extracted. The inner contour may be extracted from the generated binary ROI image, by finding the closest points to the border from the mask.

At 110, for the selected 2D US image, the RV is classified into a predefined shape (e.g., a classification category) selected from multiple predefined shapes (e.g., multiple classification categories). The predefined shapes may be a small number of the most common shapes in a target patient population, for example, "square" and "triangle". Other shapes may be defined. Shapes may be unique to certain target patient populations, for example, patients suffering from congenital heart disease and/or that have undergone reconstructive heart surgery and/or suffering from other heart conditions.

The shape of the RV may be classified according to the inner contour. Alternatively or additionally, the shape of the RV may be classified by a machine learning model, for example, semantic segmentation.

At 112, one or more valve and/or anatomical indications are extracted from the selected 2D image. The valve and/or anatomical indications may be identified based on the inner contour.

A tricuspid valve of the inner contour may be identified. The position of the identified tricuspid valve may be extracted from the center of the masks, and used as the lowest points of the inner contour.

An apex of the RV on the inner contour may be identified.

The contour may be cut at the new locations of annulus from both sides, i.e., at the apex and tricuspid valve.

At 114, the inner contour depicted in the selected 2D image is interpolated according to the classified shape.

Prior to the interpolation, the inner contour may be divided into a lateral side and a septal side with respect to the identified apex and/or the identified tricuspid valve. On each side, the left and right border may end at the location of the valve.

The interpolation of the inner contour may be done for each of the lateral side and the septal side according to the classified shape.

Optionally, the classified shape is selected from one of "triangle" and "square". When the lateral side is classified as "triangle", a first interpolation method is used, for example, a 2nd order polynomial. Alternatively, when the lateral side is classified as "square", a second interpolation method, which is different than the first interpolation method, is used, for example, a $4^{th}$ order polynomial.

The septal side may be interpolated using the same interpolation method regardless of the classified shape, for example, $2^{nd}$ order polynomial.

At 116, the interpolated contour and optionally the valve indications (e.g., the locations of the valve) obtained for the selected 2D US image are tracked over the full set of 2D ultrasound images, or the remaining part of the 2D ultrasound images, for one or more cardiac cycles.

The interpolated contour and optionally the valve indication (e.g., the locations of the valve) may be tracked, for example, using optical flow and/or kernelized correlation filters (KCF) and/or combinations thereof.

At 118, a first 2D ultrasound image depicting an end-diastole (ED) state, and a second 2D US image depicting an end-systole (ES) state are identified from the multiple 2D images. Optionally, the first and second 2D US images depicting the ED and ES state are identified for each cardiac cycle.

The first and second 2D US images depicting respectively the ED and ES states are identified according to an area of the RV computed for each 2D US image according to the tracked interpolated inner contour and optionally the identified valve indications (e.g., the locations of the valve). The first 2D image depicting the ED state is identified according to a maximal value of the area for the 2D images (e.g., per cardiac cycle). The second 2D US image depicting the ES state is identified according to a minimal value of the area for the 2D images (e.g., per cardiac cycle).

As described herein, the first and second 2D US images depicting respectively the ED and ES states are identified without using correlated ECG data.

After the ED and ES US images are identified for each cardiac cycle based on the tracking performed using the selected 2D US image (for which the contour has been interpolated), the inner contour may be extracted (e.g., as described with reference to 108) and the inner contour may be interpolated (e.g., as described with reference to 114) for the ED and ES US images, and optionally the first and/or last images of each cardiac cycle. The area enclosed by the interpolated inner contour (also referred to herein as chamber area) may be more accurately computed. The clinical parameter(s), as described herein, may be computed according to ED and ES images with interpolated inner contours, for example, using the chamber areas computed for the ED and ES images based on the interpolated inner contours, as described herein.

At 120, the area of the RV and/or defined by the inner contour for each US frame of the multiple US frames may be calculated. The area of the RV and/or inner contour may serve as one of the clinical parameters, and/or be used for calculation of the one or more clinical parameters.

The area of the chamber, which is the area enclosed in the tracked contours, may be computed using the following exemplary process: A model of a trajectory of a tricuspid annulus location on the free wall between each pair of ED and ES denoting systole, and ES and next sequential ED US 2D images denoting diastole is created, by building a linear displacement model of the y coordinate of the left annulus (free wall) by dividing the distance between each pair of frames by the number of frames between them. The septal side may be tracked without a trajectory since there is less motion and/or the septal side is more distinguished than the tricuspid annulus on the free wall. A predicted valve location is compared to actual location obtained from the tracking. When the deviation is high (e.g., above a threshold), the tracked valve location is corrected according to the model. The border point interpolation process is repeated, taking into account the corrected location of the left annulus point, to obtain a corrected inner contour. Border points interpolation may be done on the tracked contours in each US frame. The area of the chamber, which is enclosed in the tracked contours for each 2D ultrasound image based on the respective inner contour, may be calculated using the corrected inner contour when the deviation is above the threshold, or the initially computed inner contour when the deviation is below the threshold.

At 122, one or more clinical parameters of the RV are computed according to the tracked interpolated inner contour.

Optionally, the clinical parameter(s) are computed per cardiac cycle. It is noted that there may be beat to beat variations of the clinical parameter(s), for example, in the case of an arrhythmias. The variation of clinical parameter (s) over multiple cardiac cycles may be statistically quantified, for example, plotted as a graph, and/or the standard variation and/or external boundary values may be computed.

One or more of the following clinical parameters may be computed:

Fractional area change (FAC), which denotes a surrogate measurement of RV ejection fraction (EF), expressed as a percentage change in the RV chamber cross sectional area and/or volume from end-diastole (ED) to end-systole (ES). FAC is automatically computed by selecting the identified 2D ultrasound frames corresponding to ED and ES, and for each one of the ED and ES frames, tracing the endocardial border from the annulus, along the free wall to the apex, and then back to the annulus, along the interventricular septum. From the identified borders, the cross sectional area of the RV cavity in diastole (i.e., end-diastole area (EDA)) and systole (i.e., end-systole area (ESA)) are respectively calculated.

FAC may be computed by the following exemplary process: computing a respective area of the RV in diastole (EDA) and systole (ESA) from the respective endocardial border of the ES and ED 2D ultrasound frames, and computing the FAC according to the mathematical relationship: FAC=(EDA−ESA)*100/EDA, where EDA denotes an area of the RV in diastole, and ESA denotes an area of the RV in systole.

Tricuspid annular plane systolic excursion (TAPSE), which denotes a linear measurement of the RV longitudinal function. TAPSE is measured by placing an M-mode cursor through the tricuspid annulus (free wall) and measuring the amplitude of longitudinal motion of the annulus in systole.

TAPSE may be computed using the following exemplary process: computing the distance of lateral free wall tricuspid valve annulus from the apex in ED to obtain a first value, computing the distance of lateral free wall tricuspid valve annulus from the apex in ES to obtain a second value, and computing a difference between the first value and the second value. Alternatively or additionally, the difference between the first value and the second value may be calculated from a tip of a sector (e.g., as done in M-Mode). Optionally, the sector and/or the tip are automatically detected. Alternatively or additionally, the sector and/or the tip are obtained from DICOM parameters associated with the US images.

Free wall strain (FWS) denotes as a percentage of change in myocardial deformation. FWS denotes the maximum strain of the free wall Free wall strain may be calculated using Doppler. Using standard manual approaches, care should be taken to align the segment in the center of the sector to avoid errors due to the angle dependence.

In contrast, using the automated approaches described herein, FWS is computed for each respective cardiac cycle, using the following exemplary process:

Measuring the length of the contour throughout the respective cardiac cycle, where in each 2D US image the strain is computed according to the following mathematical relationship:

$$Strain = Li - L0/L0$$

where:

$L0$ denotes the length of the free contour in the 2D US frame depicting ED, and $Li$ denotes the length of the Free contour in 2D US frame denoted i.

The FWS denoting the maximum strain for the respective cardiac cycle is computed by identifying the minimum value of computed plurality of values of Strain over the respective cardiac cycle (e.g., computing and/or plotting a curve for the Strain values). It is noted that the value of Stain is a negative number.

The first frame in each beat may be selected as the ED frame.

Peak systolic velocity of the tricuspid annulus (S') denotes a tissue Doppler-derived measurement of the velocity of the basal free wall segment motion.

S' may be computed using the following exemplary process: Computing a displacement curve by computing a respective distance of lateral free wall tricuspid valve annulus from the apex each of the 2D US images of a respective cardiac cycle, and subtracting from each respective distance the relative displacement denoting a change in distance. Alternatively or additionally, the respective distance of lateral free wall tricuspid valve annulus from the apex may be calculated from a tip of a sector (e.g., as done in M-Mode). Optionally, the sector and/or the tip are automatically detected. Alternatively or additionally, the sector and/or the tip are obtained from DICOM parameters associated with the US images (Reference Pixel X0, Reference Pixel Y0 in the DICOM tags [see for example, http://dicom(dot)nema(dot)org/medical/Dicom/2018d/output/chtml/part03/sect_C(dot)8(dot)5(do t)5(dot)html]). A distance curve may be derived and used to obtain the velocity of the movement in a corresponding location (e.g., denoted dx/dt). The distance curve may be computed by computing the change in distance (e.g., denoted dx) by subtracting the respective distance in a current 2D US image from the previous distance computed for the previous 2D US image in the sequence, where each respective change in distance is divided by a time of the respective 2D image (e.g., elapsed time between the two 2D US images). S' is obtained as the maximum of the velocity value per respective cardiac cycle.

Other examples include: RV basal diameter (RVD1), RV mid diameter (RVD2) and RV length (RVD3).

At 124, the subject for which the 2D US images of the RV were captured is diagnosed and/or treated according to the computed clinical parameter(s).

Exemplary diagnoses include: impaired heart function, cardiac injury due to COVID-19, pulmonary embolism, pulmonary hypertension (PH), congenital heart disease (CHD), coronary artery disease, left-sided heart failure (HF), and valvular heart disease.

Exemplary treatments effective to treat the diagnosed medical condition include: fibrinolysis, thrombolytic, anticoagulant, pacemaker, beta blockers, nitrates, oxygen, morphine, ACE inhibitors, insulin, ATII receptor blockers (ARBs), diuretics, cardiac defibrillation, cardiac surgery, trans catheterization, stent placement, valve replacement.

At 126, features described with reference to 102-124 may be iterated, optionally over multiple temporal imaging sessions, for example, to track changes of the clinical parameter(s) over time.

The diagnoses and/or treatment of the patient may be adjusted according to the changes of the clinical parameter(s). It is noted that when one or more image processing features performed using the respective 2D US image fail, the respective 2D US image may be ignored, and the next sequential 2D US image may be processed.

Optionally, the clinical parameter(s) are iteratively computed over multiple time intervals. A trend line of the values of the clinical parameters for the time intervals may be computed and/or plotted, for example, a best fit line using regression. A prediction of when the trend line is expected to cross a threshold indicating a clinically significant change in a medical condition of the subject may be made. An alert may be raised accordingly, for example, presented on a display.

Figure 3A:
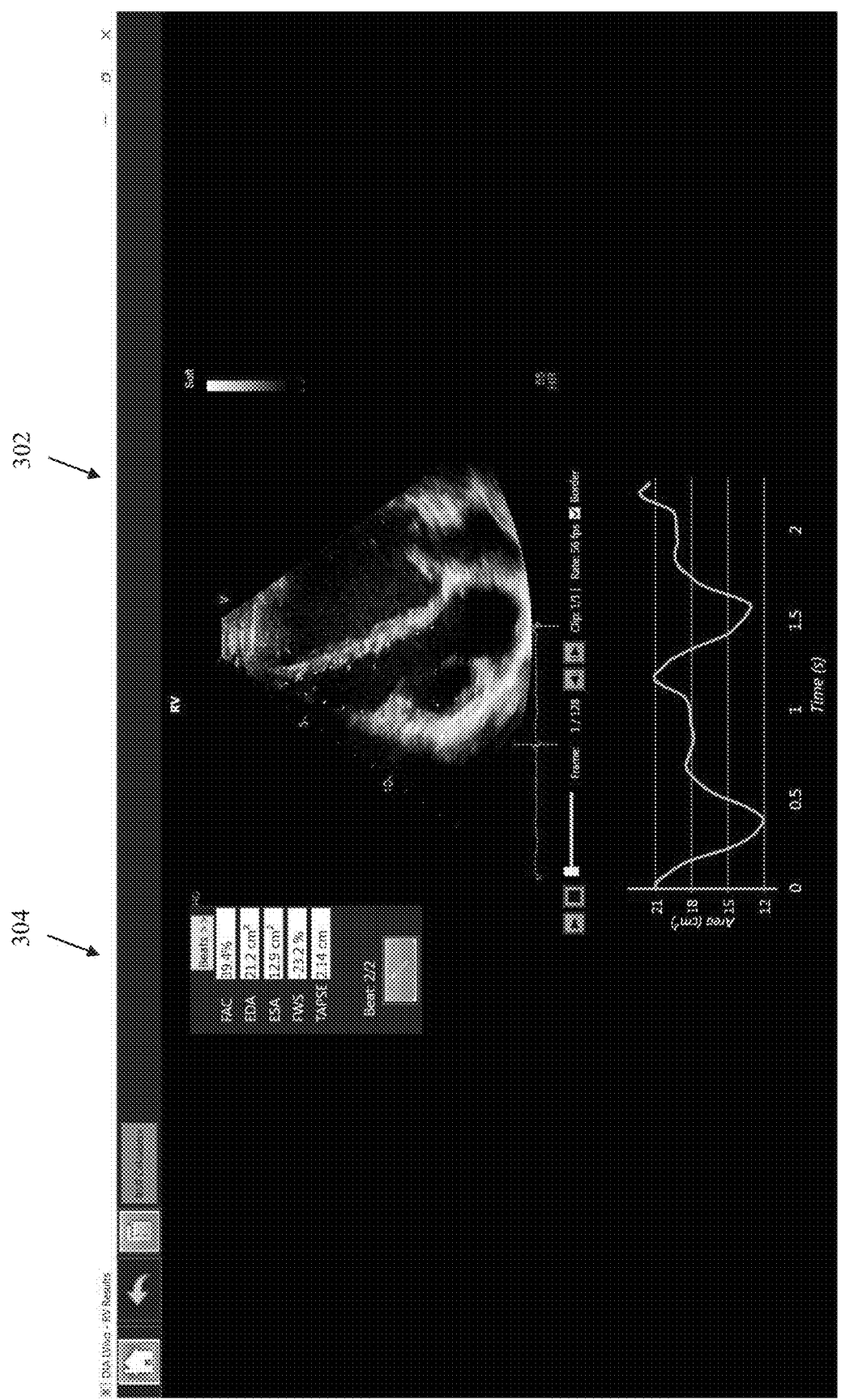
FIGS. 3A-3E are schematics depicting example ultrasound images that are processed for automatic computation of clinical parameters, in accordance with some embodiments of the present invention.
Figure 3B:
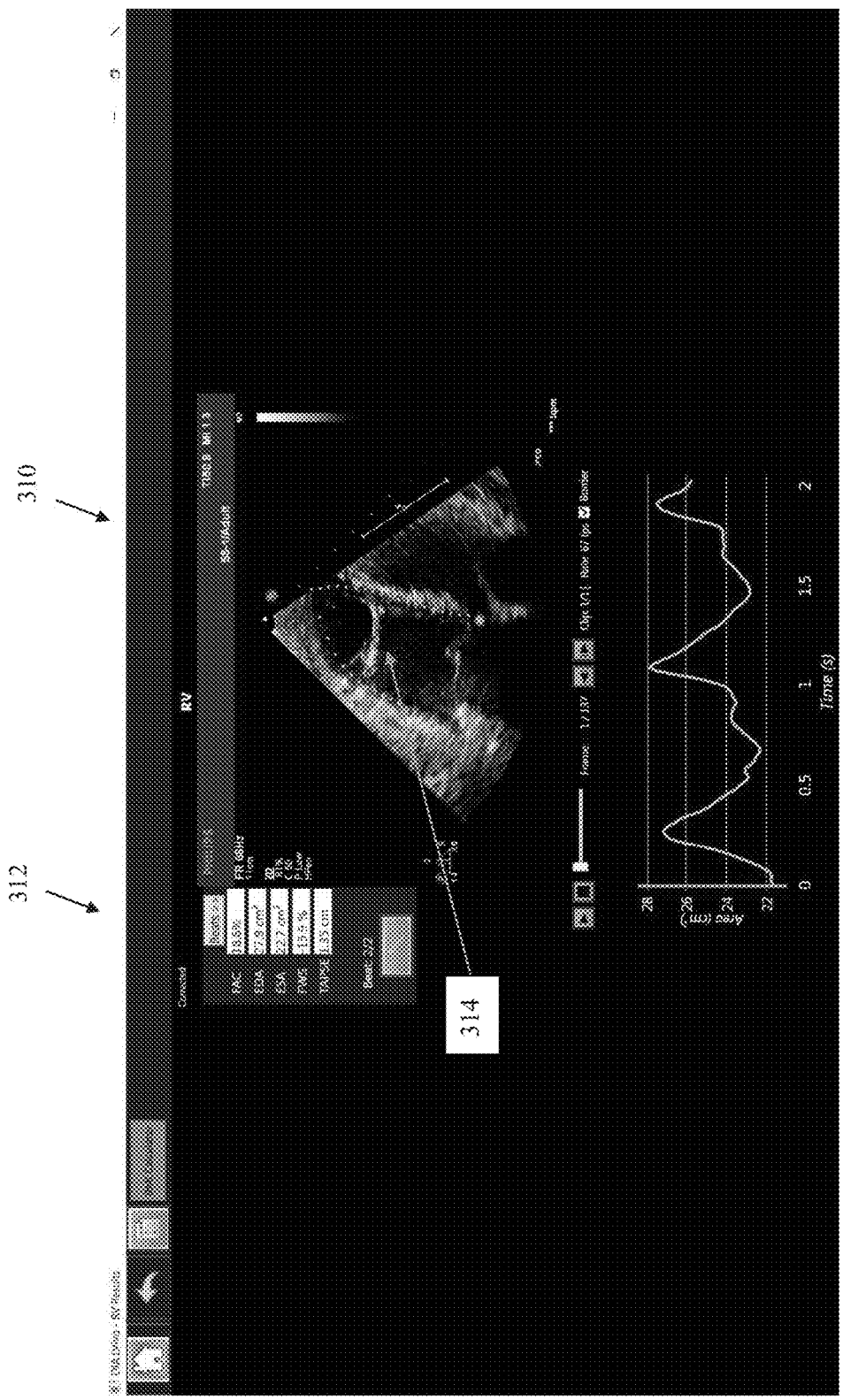
Figure 3C:
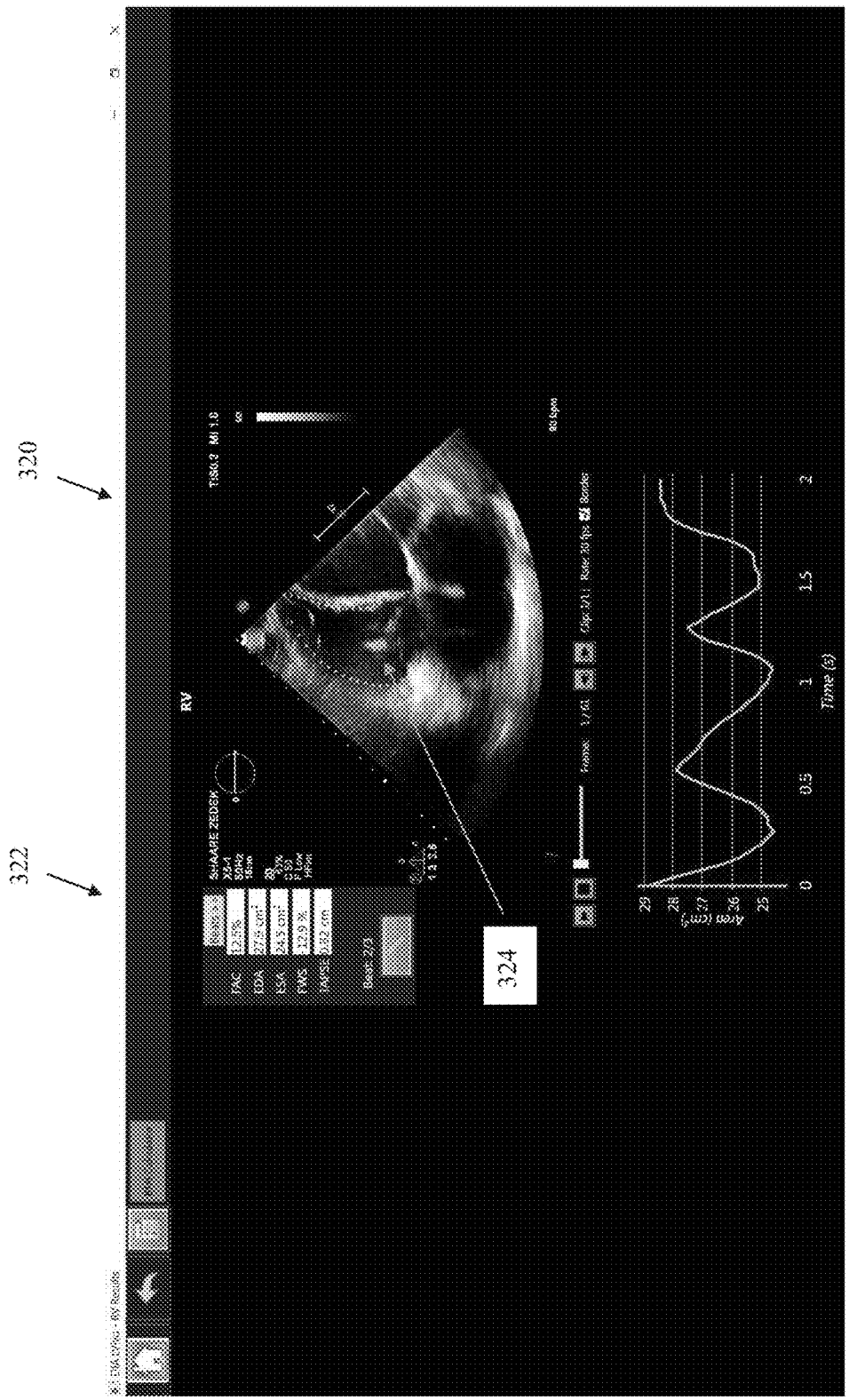
Figure 3D:
Figure 3E:
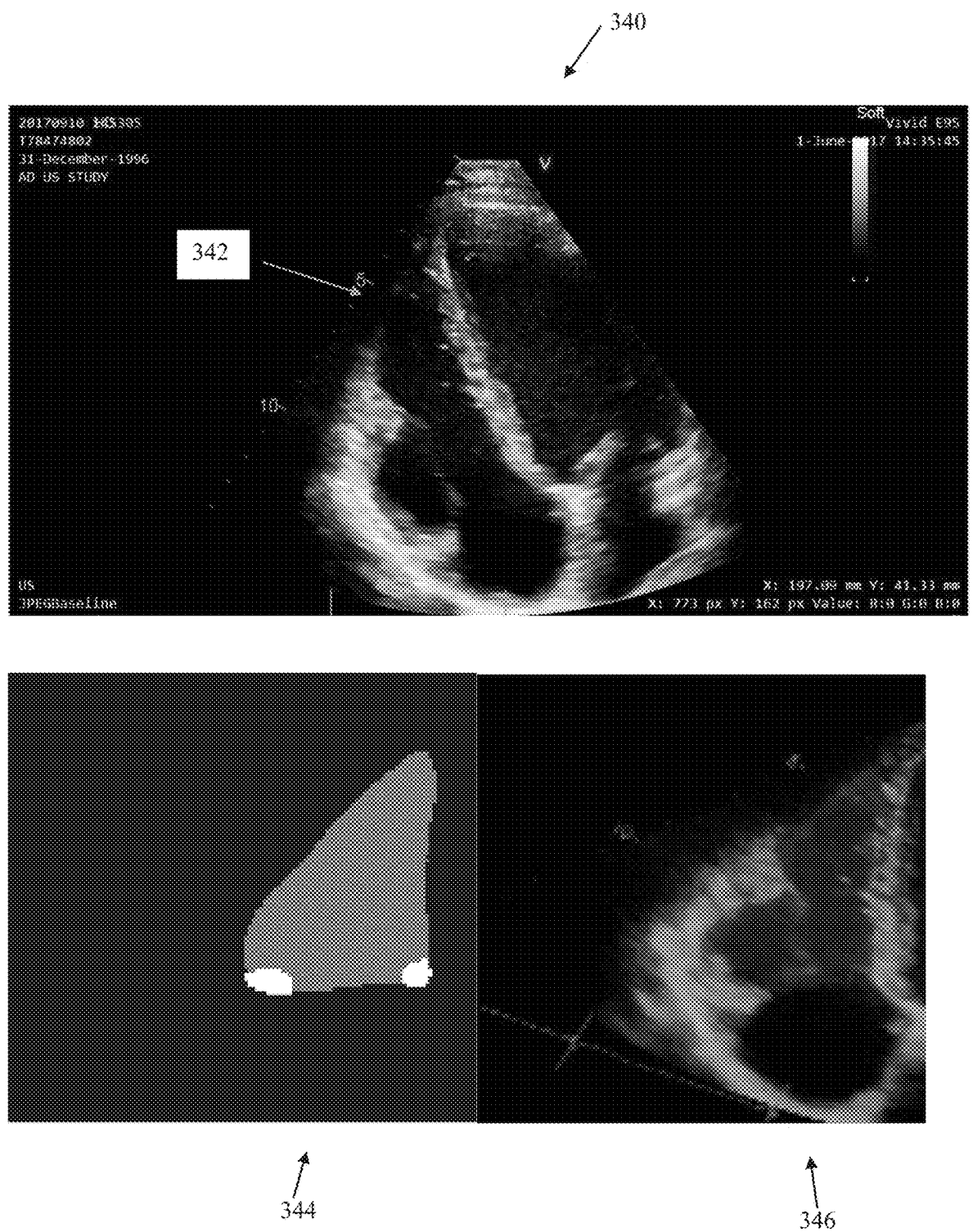

Reference is now made to FIGS. 3A-3E, which are schematics depicting example ultrasound images that are processed for automatic computation of clinical parameters, in accordance with some embodiments of the present invention. FIGS. 3A-3C depict exemplary computed clinical parameters using ultrasound images of RV of different subjects, including normal and impaired RV. FIGS. 3D-3E depict exemplary masks overlaid on ultrasound images.

FIG. 3A depicts a GUI 302 presenting clinical parameters 304 of FAC, EDA, ESA, FWS, and TAPSE, automatically computed, as described herein. Clinical parameters 404 are measured for a normal RV function, having a "triangular" shape, using 2D ultrasound images captured using focused 4CH view of the RV.

FIG. 3B depicts another GUI 310 presenting another set of clinical parameters 312 of FAC, EDA, ESA, FWS, and TAPSE, automatically computed, as described herein. Clinical parameters 312 are measured for an impaired RV function, having a "square" shape. A moderator band 314 typical to RV is depicted. Moderator band 314 connects the interventricular septum to the anterior papillary muscle.

FIG. 3C depicts yet another GUI 320 presenting yet another set of clinical parameters 322 of FAC, EDA, ESA, FWS, and TAPSE, automatically computed, as described herein. Clinical parameters 322 are measured for an impaired RV function with pacemaker 324.

FIG. 3D depicts a raw captured ultrasound image 330 of a square shaped RV. A segmentation mask 332 of the RV cavity and/or of the tricuspid valve is computed from image 330, as described herein. Schematic 334 depicts an overlay of segmentation mask 332 on image 330 or part thereof, for example, an ROI computed from image 330, as described herein.

FIG. 3E depicts another raw captured ultrasound image 340 of a triangular shaped RV, denoting a normal RV. Arrow 342 denotes a dropout of the apical part of the free wall. A segmentation mask 344 of the RV cavity and/or of the tricuspid valve is computed from image 340, as described herein. Schematic 346 depicts an overlay of segmentation mask 344 on image 340 or part thereof, for example, an ROI computed from image 340, as described herein.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non limiting fashion.

Inventors performed an experiment for comparing clinical parameters automatically computed for the right ventricle by at least some implementations described herein, with clinical parameters manually determined based on standard clinical guidelines and/or standard ultrasound practices. The manually measured clinical parameters were done qualitatively by visual estimation and thus are subjective and requires high level of expertise. The clinical parameters were automatically measured from apical 4 chamber (4CH) focused or modified ultrasound clips. Inventors selected the clinical parameters of End Diastolic Area (EDA) Free Wall Strain (FWS), since in covid-19 patients, there is evidence showing that enlarged RV (denoted by EDA) and abnormal FWS correlate with high mortality. Assessment of the RV in the Point of Care settings can assist the differential diagnosis and provide important clinical information in early stages, close to the onset of symptoms.

Methods: A retrospective study of 100 patients who underwent routine echocardiographic examination was conducted in three medical centers in US and Israel. The apical 4CH focused or modified clips were interpreted by experts to evaluate RV size and function. The EDA measured manually by two sonographers and the FWS measured by semi-automated Velocity Vector Imaging software (VVI by Siemens) were compared to the same clinical parameters obtained automatically by at least some implementations described herein, using linear regression and Bland Altman analysis.

Results: 100 cases were included, 39% females and 61% males. Mean age was 64.7 [19-92]. Mean BMI was 28.1 [6.8-17.6]. 74% had pulmonary hypertension and 19% had lung disease. 36% were considered abnormal by their fractional area change values and 64% were considered normal. Three cases were non-interpretable by the physicians thus excluded from the analysis. At least some implementations described herein were able to process 99% of the cases.

Figure 4:
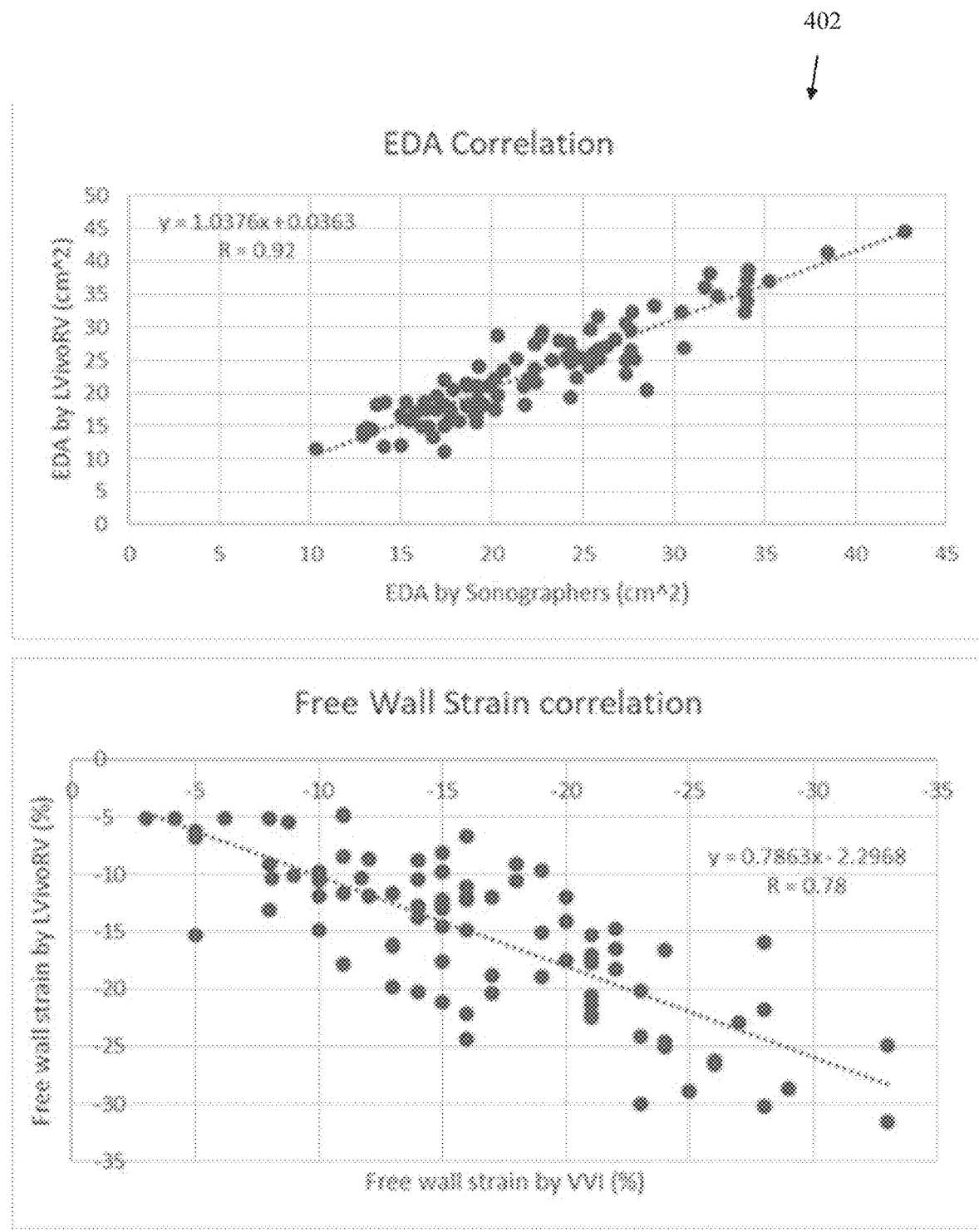
FIG. 4 includes a graph depicting EDA correlation results and a graph depicting FWS correlation results, for the experiment described herein.

Reference is now made to FIG. 4, which includes a graph 402 depicting EDA correlation results and a graph 404 depicting FWS correlation results, for the experiment described herein. Each respective x-axis denotes the respective value manually determined by sonographers. Each respective y-axis denotes the respective value automatically computed by at least some implementations of the systems, methods, apparatus, and/or code instructions described herein (denoted LVivoRV). As seen in graphs 402 and 404, excellent correlation was obtained for graph 402 denoting EDA between the sonographers' average of manual measurements and the automated EDA by at least some implementations described herein with $r=0.92$ ($p<0.0001$, 95% CI 0.88-0.94). The bias and limits of agreement for EDA were $0.87\pm5.76$ cm^2. For FWS, 4 cases were manually excluded due to insufficient image quality. The Bland Altman analysis for FWS showed small bias and limits of agreement of $0.7\pm12.2\%$. As seen in graph 404, a very good correlation of $r=0.78$, (95% CI 0.69-0.85) was found, indicating good compatibility between the methods. The specificity and sensitivity for FWS were 80% and 77% respectively, using an optimal cutoff value of −16%, and the overall agreement was 79%.

Conclusions: The performance of at least some implementations described herein demonstrated a very good agreement with manual and semi-automated quantitative methods for RV assessment. At least some implementations described herein provide fast, accurate, objective and reproducible results and have the potential to be used at the Point of Care settings as a powerful tool for RV size and function evaluation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant US images will be developed and the scope of the term US image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method of automatically processing two-dimensional (2D) ultrasound images for computing of at least one clinical parameter of a right ventricle (RV), comprising:
    selecting one 2D ultrasound image of a plurality of 2D ultrasound images depicting at least a RV of a subject, sequentially captured over at least one cardiac cycle of the subject;
    classifying the RV depicted in the selected one 2D ultrasound image into a predefined shape selected from a plurality of predefined shapes;
    interpolating an inner contour of an endocardial border of the RV for the selected one 2D ultrasound image according to the classified predefined shape of the selected one 2D ultrasound image;
    tracking the interpolated inner contour obtained for the one 2D ultrasound image over the plurality of 2D images over the at least one cardiac cycle;
    computing, a RV area of the RV for each respective 2D ultrasound image of the plurality of 2D ultrasound images, according to the tracked interpolated inner contour;
    identifying a first 2D ultrasound image depicting an end-diastole (ED) state according to a maximal value of the RV area for the plurality of 2D images, and a second 2D US image depicting an end-systole(ES) state according to minimal value of the RV area for the plurality of 2D images; and
    computing at least one clinical parameter of the RV according to the identified first 2D ultrasound image depicting the ED state and the second 2D US image depicting the ES state.

2. The method of claim 1, further comprising, wherein the at least one clinical parameter is computed according to the first 2D ultrasound image depicting the ED state and the second 2D US image depicting the ES state with interpolated inner contour.

3. The method of claim 2, further comprising:
inputting the selected 2D image into a trained machine learning (ML) model trained on a training dataset including for each of a plurality of sample subjects, at least one 2D ultrasound image depicting a RV and a corresponding plurality of segmentation masks including: a RV cavity segmentation mask, a lateral tricuspid valve annulus segmentation mask, and a septal tricuspid valve annulus segmentation mask; and
obtaining, for the selected 2D image, as an outcome of the ML model, a plurality of segmentation masks including: a RV cavity segmentation mask, a lateral tricuspid valve annulus segmentation mask, and a septal tricuspid valve annulus segmentation mask,
extracting, an inner contour of an endocardial border of the RV for the selected one 2D ultrasound image based on the plurality of segmentation masks,
extracting a plurality of valve indications for the selected one 2D ultrasound image,
wherein the plurality of valve indications include a plurality of positions of a tricuspid valve extracted from a center region of the lateral tricuspid valve annulus segmentation mask, and extracted from a center region of the septal tricuspid valve annulus segmentation mask.

4. The method of claim 3, further comprising automatically selecting a region of interest from the selected 2D image, the ROI including the RV cavity, the lateral tricuspid valve annulus, and the septal tricuspid valve annulus, wherein inputting the selected 2D image comprises inputting the ROI into the trained ML model, wherein the at least one 2D ultrasound image of the training dataset comprises the ROI image created from the at least one 2D ultrasound image of the training dataset.

5. The method of claim 3, further comprising, for the selected 2D image of the plurality of 2D ultrasound images:
extracting a respective border of the RV depicted in the selected 2D image using the respective cavity mask; and
generating a binary image using the respective extracted RV border,
wherein the extracting of the inner contour for the selected 2D image is based on the binary image.

6. The method of claim 5, further comprising, for each 2D image of the plurality of 2D ultrasound images:
segmenting around the respective extracted RV border on sampled points using local contrast enhancement, wherein the binary image is of the respective extracted RV border with segmentation.

7. The method of claim 1, further comprising:
identifying a tricuspid valve of the inner contour;
identifying an apex of the RV on the inner contour,
dividing the inner contour into a lateral side and a septal side with respect to the apex and the tricuspid valve,
wherein interpolating the inner contour is done each of the lateral side and the septal side according to the classified shape.

8. The method of claim 7, wherein the classified shape is selected from one of "triangle" and "square", and the lateral side is interpolated using a first interpolation method when the shape is triangle, and the lateral side is interpolated using a second interpolation method when the shape is square.

9. The method of claim 1, wherein the 2D ultrasound images exclude a correlation with electrocardiogram (ECG) data of the subject, and the ED state and the ES state are identified from the plurality of 2D ultrasound images without the correlation with ECG data.

10. The method of claim 1, further comprising:
creating a model of a trajectory of a tricuspid annulus location on a free wall between each pair of ED and ES denoting systole, and ES and next ED 2D images denoting diastole;
comparing a predicted valve location to actual location from tracking and correct high deviation using the model and repeat interpolation to compute a deviation;
when the deviation is above a threshold, the tracked valve location is corrected according to the model, and a border point interpolation process is repeated taking into account a corrected location of a left annulus point to obtain a corrected inner contour;
calculate area of a chamber denoting the area enclosed in the tracked contours for each 2D ultrasound image based on the corrected inner contour;
wherein the at least one clinical parameter comprises the calculated area.

11. The computer implemented method of claim 1, wherein tracking further comprises tracking a plurality of locations of a tricuspid valve obtained for the one 2D ultrasound image, and computing the RV area further comprises computing the RV area according to the tracked plurality of locations of the tricuspid valve.

12. The computer implemented method of claim 1, wherein the at least one clinical parameter comprises at least one of: (i) a fractional area change (FAC) for the RV, (ii) a free wall strain (FWS) for the RV denoting the maximum strain of the free wall, wherein the FWS is computed for each respective cardiac cycle for the RV, RV basal diameter (RVD1), RV mid diameter (RVD2) and RV length (RVD3).

13. The computer implemented method of claim 1, wherein the at least one clinical parameter comprises at least one of: (i) a tricuspid annular plane systolic excursion (TAPSE), and further comprising computing the TAPSE by:
computing the distance of lateral free wall tricuspid valve annulus from an apex in ED to obtain a first value,
computing the distance of lateral free wall tricuspid valve annulus from the apex in ES to obtain a second value, and computing a difference between the first value and the second value, and
(ii) a peak systolic velocity of a tricuspid annulus (S'), and further comprising computing the S' by: computing a displacement curve by computing a respective distance of lateral free wall tricuspid valve annulus from an apex each of the plurality of 2D US images of a respective cardiac cycle and subtracting from each respective distance the relative displacement denoting a change in distance, wherein the change in distance is computed by deriving a distance curve of the respective 2D image with respect to frame time to obtain the velocity of movement in a corresponding location, wherein S' denotes the maximum of the velocity value per respective cardiac cycle.

14. The method of claim 1, wherein each of the at least one clinical parameters is computed for each cardiac cycle depicted in the plurality of 2D ultrasound images.

15. The method of claim 1, further comprising treating the subject for a medical condition selected from the group consisting of: impaired heart function, cardiac injury due to COVID-19, pulmonary embolism, pulmonary hypertension (PH), congenital heart disease (CHD), coronary artery disease, left-sided heart failure (HF), right-sided heart failure, and valvular heart disease, using a treatment effective for the medical condition, selected from the group consisting of: fibrinolysis, thrombolytic, anticoagulant, pacemaker, beta blockers, nitrates, oxygen, morphine, ACE inhibitors, insulin, ATII receptor blockers (ARBs), diuretics, cardiac defibrillation, cardiac surgery, trans catheterization, stent placement, valve replacement.

16. The method of claim 1, further comprising iteratively computing the at least one clinical parameter over a plurality of time intervals, and plotting, on a display, a trend line of the at least one clinical parameters for the plurality of time intervals.

17. The method of claim 1, further comprising selecting a computational processes from a plurality of computational process according to the predefined shape selected from the plurality of predefined shapes.

18. A system for automatically processing two dimensional (2D) ultrasound images for computing of at least one clinical parameter of a right ventricle (RV), comprising:
at least one hardware processor executing a code for:
selecting one 2D ultrasound image of a plurality of 2D ultrasound images depicting at least a RV of a subject, sequentially captured over at least one cardiac cycle of the subject;
classifying the RV depicted in the selected one 2D ultrasound image into a predefined shape selected from a plurality of predefined shapes;
interpolating an inner contour of an endocardial border of the RV for the selected one 2D ultrasound image according to the classified predefined shape of the selected one 2D ultrasound image;
tracking the interpolated inner contour obtained for the one 2D ultrasound image over the plurality of 2D images over the at least one cardiac cycle;
computing, a RV area of the RV for each respective 2D ultrasound image of the plurality of 2D ultrasound images, according to the tracked interpolated inner contour;
identifying a first 2D ultrasound image depicting an end-diastole (ED) state according to a maximal value of the RV area for the plurality of 2D images, and a second 2D US image depicting an end-systole(ES) state according to minimal value of the RV area for the plurality of 2D images; and
computing at least one clinical parameter of the RV according to the identified first 2D ultrasound image depicting the ED state and the second 2D US image depicting the ES state.

19. A non-transitory computer readable medium for automatically processing two dimensional (2D) ultrasound images for computing of at least one clinical parameter indicative of a right ventricle (RV) comprising program instructions which, when executed by a processor, cause the processor to perform:
selecting one 2D ultrasound image of a plurality of 2D ultrasound images depicting at least a RV of a subject, sequentially captured over at least one cardiac cycle of the subject;
classifying the RV depicted in the selected one 2D ultrasound image into a predefined shape selected from a plurality of predefined shapes;
interpolating an inner contour of an endocardial border of the RV for the selected one 2D ultrasound image according to the classified predefined shape of the selected one 2D ultrasound image;
tracking the interpolated inner contour obtained for the one 2D ultrasound image over the plurality of 2D images over at least one cardiac cycle;
computing, a RV area of the RV for each respective 2D ultrasound image of the plurality of 2D ultrasound images, according to the tracked interpolated inner contour;
identifying a first 2D ultrasound image depicting an end-diastole (ED) state according to a maximal value of the RV area for the plurality of 2D images, and a second 2D US image depicting an end-systole(ES) state according to minimal value of the RV area for the plurality of 2D images; and
computing at least one clinical parameter of the RV according to the identified first 2D ultrasound image depicting the ED state and the second 2D US image depicting the ES state.

* * * * *